US005219098A

United States Patent [19]

Tada

[11] Patent Number: 5,219,098

[45] Date of Patent: Jun. 15, 1993

[54] COMBINATION OF A CONTAINER AND A MANUALLY OPERATED PUSH TYPE DISPENSER

[75] Inventor: Tetsuya Tada, Tokyo, Japan

[73] Assignee: Canyon Corporation, Tokyo, Japan

[21] Appl. No.: 706,283

[22] Filed: May 28, 1991

[30] Foreign Application Priority Data

Jun. 15, 1990 [JP] Japan .................................. 2-157107
Jul. 7, 1990 [JP] Japan .................................. 2-179925

[51] Int. Cl.$^5$ ................................................ G01F 11/02

[52] U.S. Cl. .................................... 222/153; 222/321; 222/324

[58] Field of Search ............... 222/320, 321, 323, 324, 222/383, 465.1, 470, 471, 472, 473, 474, 402.13, 402.15, 153, 182

[56] References Cited

U.S. PATENT DOCUMENTS

| | | | |
|---|---|---|---|
| 2,185,534 | 1/1940 | Bernhardt | 222/324 X |
| 2,796,204 | 6/1957 | Math | 222/324 |
| 3,216,624 | 11/1965 | Corsette | 222/321 X |
| 3,306,497 | 2/1967 | Kenney et al. | 222/321 X |
| 3,348,740 | 10/1967 | O'Donnell | 222/153 |
| 3,367,540 | 2/1968 | Lehmann | 222/153 |
| 3,478,935 | 11/1969 | Brooks | 222/321 |
| 3,884,393 | 5/1975 | Wassilieff | 222/153 |
| 3,955,716 | 5/1976 | Goncalves | 222/153 |
| 4,124,148 | 11/1978 | Vieler et al. | 222/321 |
| 4,129,235 | 12/1978 | Haas | 222/385 X |
| 4,317,531 | 3/1982 | Saito et al. | 222/321 |
| 4,434,915 | 3/1984 | Kirk, Jr. | 222/321 X |
| 4,589,573 | 5/1986 | Tada | 222/321 |
| 4,923,094 | 5/1990 | O'Neill | 222/321 |
| 5,083,683 | 1/1992 | Knickerbocker | 222/321 X |

FOREIGN PATENT DOCUMENTS

| | | | |
|---|---|---|---|
| 0105202 | 4/1984 | European Pat. Off. . | |
| 1625201 | 2/1970 | Fed. Rep. of Germany . | |
| 2336313 | 7/1977 | France . | |
| 61-40373 | 11/1986 | Japan . | |
| 61-40374 | 11/1986 | Japan . | |
| 61-40375 | 11/1986 | Japan . | |
| 62-42776 | 11/1987 | Japan . | |
| 8901365 | 2/1989 | World Int. Prop. O. | 222/321 |

*Primary Examiner*—Kevin P. Shaver
*Attorney, Agent, or Firm*—Frishauf, Holtz, Goodman & Woodward

[57] ABSTRACT

A liquid container to which a cylinder of a manually operated push type dispenser is attached is so shaped that it can be held with fingers except for the thumbs. An assembly is provided between the cylinder and a push button fixed to a distal end of a piston for preventing the push button from rotating. A flange is integrally formed with the cylinder to prevent the slipping of the fingers holding the container and oriented in substantially the same direction as an orifice of the push button.

3 Claims, 18 Drawing Sheets

PRIOR ART

COMBINATION OF A CONTAINER AND A MANUALLY OPERATED PUSH TYPE DISPENSER

BACKGROUND OF THE INVENTION

1. Field of the Invention

The present invention relates to a combination of a container and a manually operated push type dispenser having a cylinder attached to a mouth of the liquid container, a piston reciprocally movable in the cylinder, and a push button fixed to a distal end of the piston and having an orifice communicating with the cylinder, the piston being moved reciprocally in the cylinder, to suck up the liquid from the container into the cylinder and to pressurize the liquid in the cylinder, so as to dispense the liquid.

More particularly, the invention relates to a combination of a container and a manually operated push type dispenser having a nozzle head which can be pushed down with the thumb.

2. Description of the Prior Art

The problem of destroying the ozone layer is now a great problem. Hence, dispensers which use no freon gas to pressurize liquid, and which are rather manually operated to pressurize and force out liquid, are drawing more and more attention. Dispensers of this kind are roughly classified into two types. The first is known as trigger type, and the second is known as push type (also called "finger-operated type").

A trigger type dispenser and a push type dispenser are identical in fundamental structure. Both comprise a dispenser body attached to the mouth of a liquid container, a cylinder formed in the dispenser body, and a piston slidably inserted in the cylinder. In either type, as the piston is manually reciprocated in the cylinder, liquid is sucked up from the container into the cylinder, pressurized in the cylinder, and forced out in spray. The only difference between the two types is found in the way of reciprocating the piston.

FIG. 16 shows a manually operated trigger type dispenser. As illustrated in FIG. 16, the dispenser body is held in the palm. More precisely, the dispenser body is held between the thumb, on the one hand, and some fingers (e.g., the forefinger and the middle finger), on the other hand, with the ring finger and the little finger resting on the container. When the user squeezes the trigger 111 of the dispenser with the forefinger and the middle finger, the piston is reciprocated in the cylinder. An orifice is located in the distal end of the nozzle cap of the dispenser and is connected to the cylinder by a secondary valve. As the piston is reciprocated in the cylinder, the liquid pressurized in the cylinder is dispensed through the orifice.

FIG. 17 shows a manually operated push type dispenser. As shown in FIG. 17, the dispenser body and the top portion of a container are held between the thumb, on the one hand, and the middle, ring, and little fingers, on the other hand, while the forefinger is placed on the push button 620 (also called "head") fixed to the top end of the piston. The button 620 can be pushed down with the forefinger, thereby to move the piston downwards. A spout 117 is integrally formed with the push button 620. When the push button 620 is pushed down, the piston is moved down, too, pressurizing the liquid in the cylinder located in the dispenser body. The pressurized liquid is pumped up, and flows through the passage and the secondary valve, both formed in the push button 620. The liquid is then jetted out from the nozzle located in the spout 117.

FIGS. 18A and 18B illustrate a smaller manually operated push type dispenser. As can be seen from these figures, this dispenser has no spout. The liquid pressurized by pushing down the push button 720 is jetted out through the orifice 731 of the nozzle 730 embedded in the push button 720.

No freon gas is used in the trigger type dispenser shown in FIG. 16 or in the push type ones illustrated in FIG. 17 and FIGS. 18A and 18B, in order to dispense the liquid. In the case of the trigger type dispenser, the trigger is squeezed to dispense the liquid in spray. In the push type dispenser, the push button is pressed down to dispense the liquid.

A foaming means, such as a net or a sponge member, can be placed in front of the orifice of each dispenser described above. When the foaming means is used, the pressurized liquid will be applied in the form of foam.

In a dispenser, wherein freon gas is utilized to pressurize the liquid, generally known as "aerosol type dispenser", the pressurized liquid is continuously forced out as long as the nozzle is kept pushed down, and a large amount of liquid can be jetted out at each operation.

By contrast, in a manually operated dispenser a large amount of liquid cannot be forced out unless the user pulls the trigger or pushes the push button many times. The amount of liquid that can be forced out at one-stroke operation (i.e., the unit amount) is SA, i.e., the product of the piston stroke S and the cross-sectional area A of the cylinder. Both the length of the piston and that of the cylinder are limited since the dispenser must be compact. It is therefore difficult to increase the piston stroke S. The cross-sectional area A can be increased, causing no great problems. When the area A is increased, however, the user must exert a greater force to pull the trigger or to push down the push button, thereby to move the piston.

Whichever type of a dispenser, an aerosol type, a trigger type, or a push type, is used, it is with the forefinger that the user operates the dispenser. That is, he or she pushes down the nozzle head of an aerosol type dispenser with the forefinger in order to jet the liquid out, pulls the trigger of a trigger type dispenser with the forefinger to force the liquid out, and pushes down the push button of a push type dispenser to jet the liquid out. The forefinger is not so tough and strong as the thumb. It is hard for the user to apply a great force on the nozzle head, the trigger, or the push button, with the forefinger. To make matters worse, the forefinger cannot be moved as freely as the thumb. It can be moved only in a plane, whereas the thumb can moved in a space.

Particularly in a push type manually operated dispenser, a sufficient force cannot be applied to the push button with the forefinger, as can be understood from the experience. Therefore, it is difficult to increase the cross-sectional area of the cylinder of the push type dispenser. Consequently, a large unit amount of liquid, defined above, cannot be obtained with the push type dispenser.

Recently, aerosol type dispensers have been developed, whose nozzle heads are pushed down with the thumb. Japanese Utility Model Publication No. 62-042776 discloses such an aerosol type dispenser. The dispenser comprises a handle made of plastics and attached to a mouth of a metal container, a valve stem, and a lever for moving the valve stem. The user holds the handle with all fingers, but the thumb, thus ultimately holding the metal container. When he or she pushes the tip of the lever with the thumb, the valve stem is moved downward, thereby to jet the liquid out.

This thumb-driven aerosol type dispenser is advantageous in two respects. First, the user can exert a relatively large force on the lever with the thumb. Second, the valve stem can create a high pressure by virtue of the principle of lever.

No manually operated dispensers have hitherto been known whose liquid pressurizing unit is driven with thumb and, thus, by a great force to pressurize liquid efficiently.

BRIEF SUMMARY OF THE INVENTION

It is therefore an object of the present invention to provide a combination of a container and a manually operated push type dispenser whose liquid-pressurizing unit is driven with the thumb.

According to one embodiment of the present invention, in order to achieve the object described above, there is provided a combination of a container and a manually operated push type dispenser, the container having such a shape that it can be held with fingers except for the thumb, and the dispenser comprising a cylinder, a flange integrally formed with the cylinder, for preventing the fingers holding the container from slipping upwards, a push button having an orifice, and a rotation-preventing means for preventing the push button from rotating. The cylinder is attached to the mouth of the container such that the flange is oriented in substantially the same direction as the orifice.

The embodiments of the present invention will now be described, with reference to the accompanying drawings. Nonetheless, the present invention is not limited to these embodiments. Needless to say, various changes and modifications can be made, without departing the scope of the present invention.

DETAILED DESCRIPTION OF THE PREFERRED EMBODIMENTS

Figure 1:
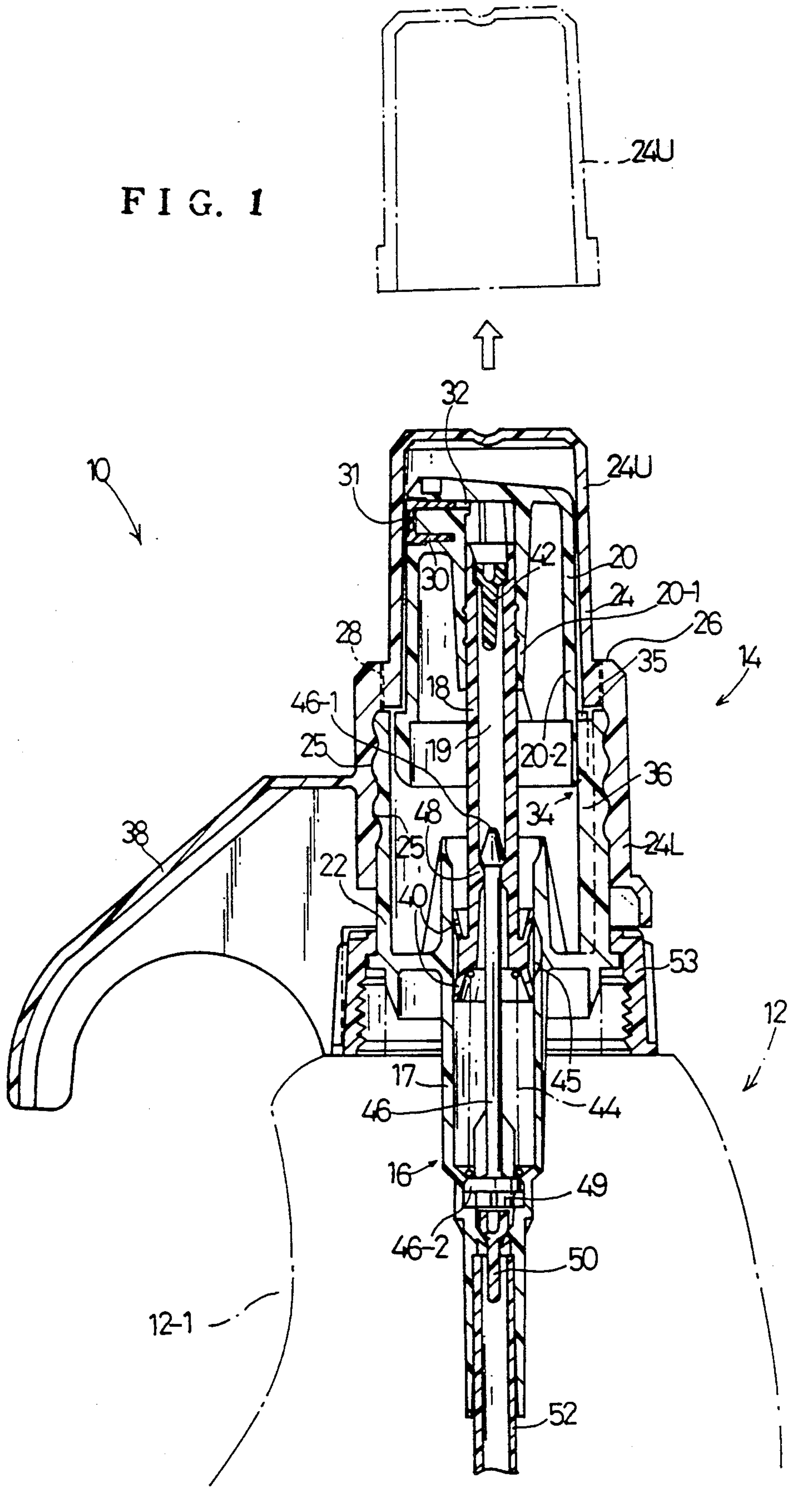
FIG. 1 is a vertical sectional view showing a combination of a container and a manually operated push type dispenser, according to the first embodiment of the present invention.
Figure 2:
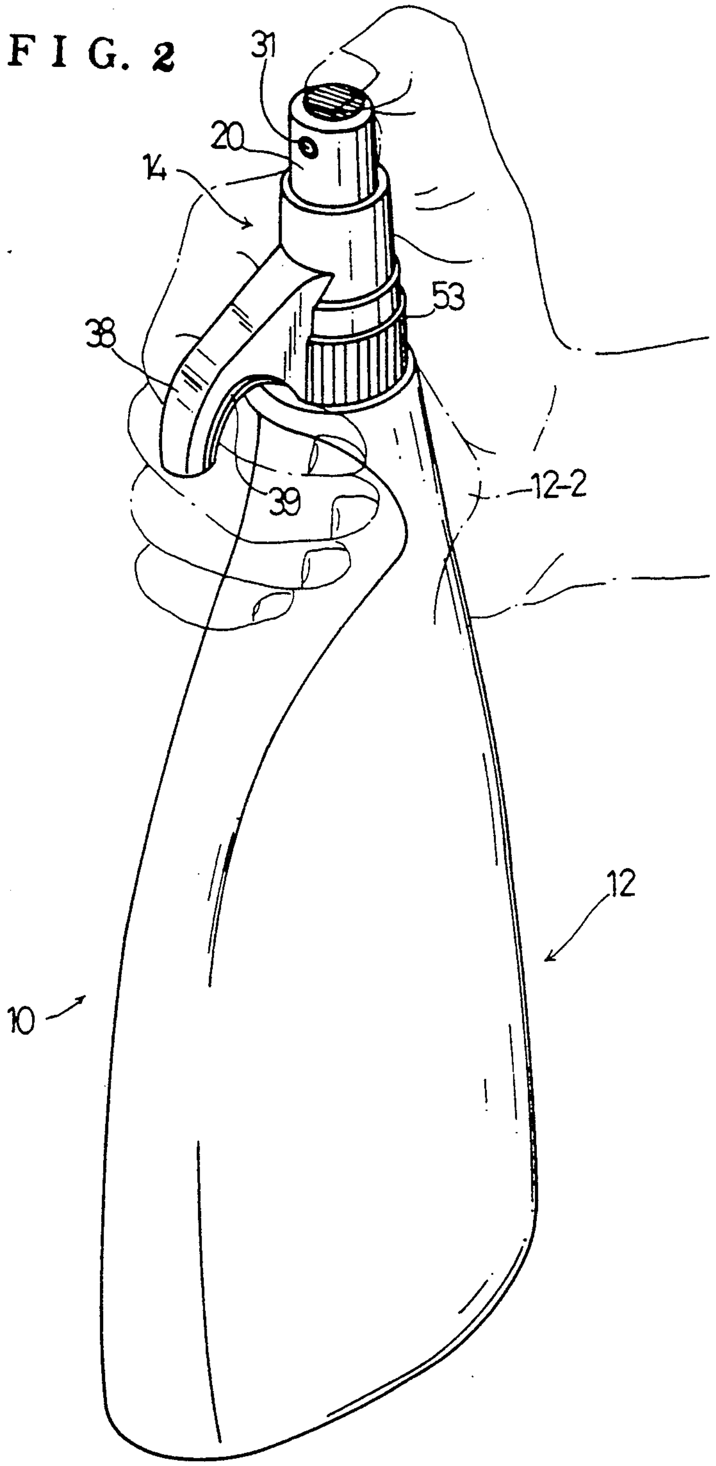
FIGS. 2, 3, and 4 are a perspective view, a side view, and a front view, respectively, illustrating the combination shown in FIG. 1.

FIGS. 1 and 2 show a container-dispenser combination 10 according to a first embodiment of the present invention. The combination 10 consists of a container 12 and a manually operated push type dispenser 14.

Figure 3:
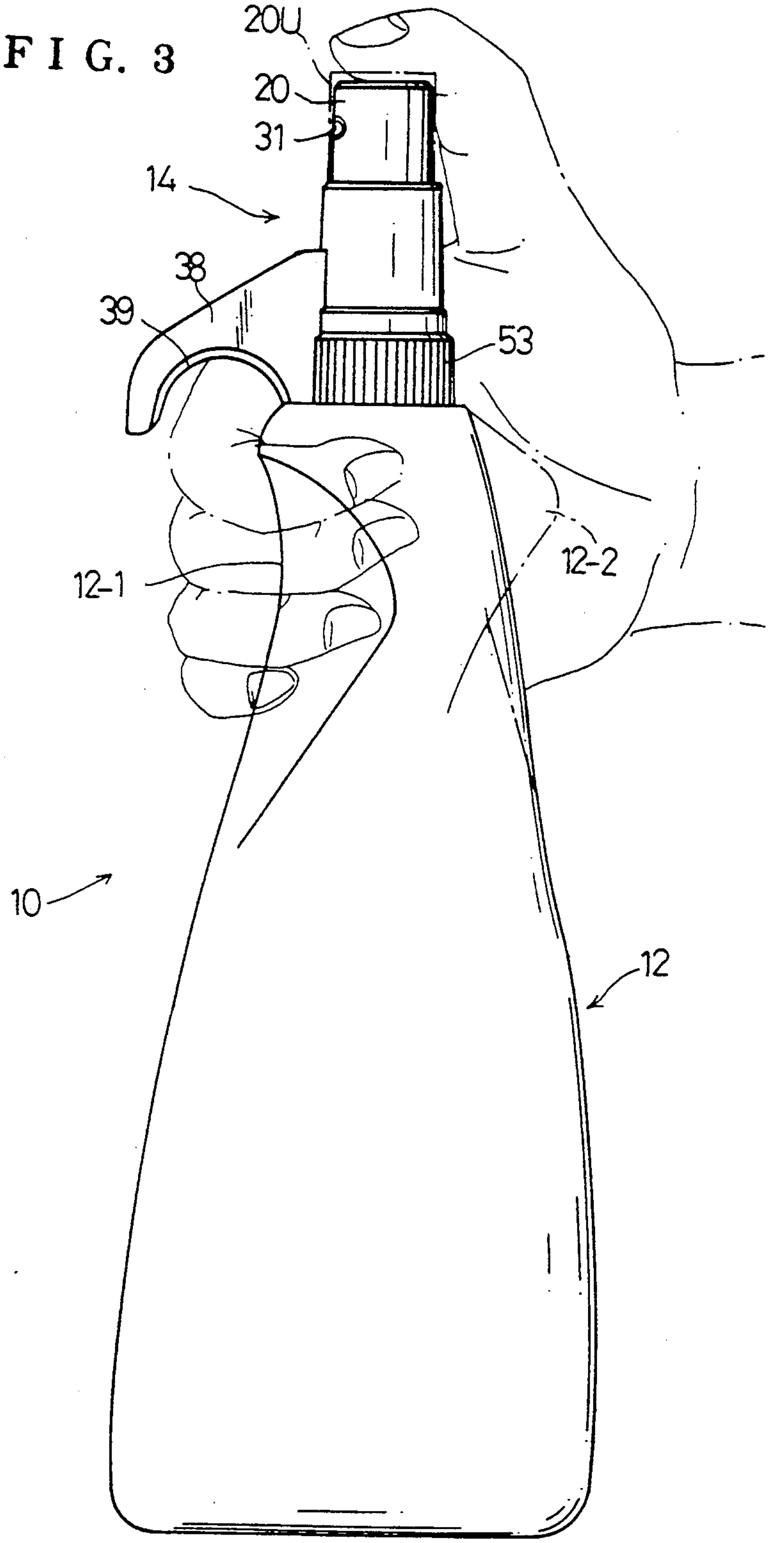
Figure 4:
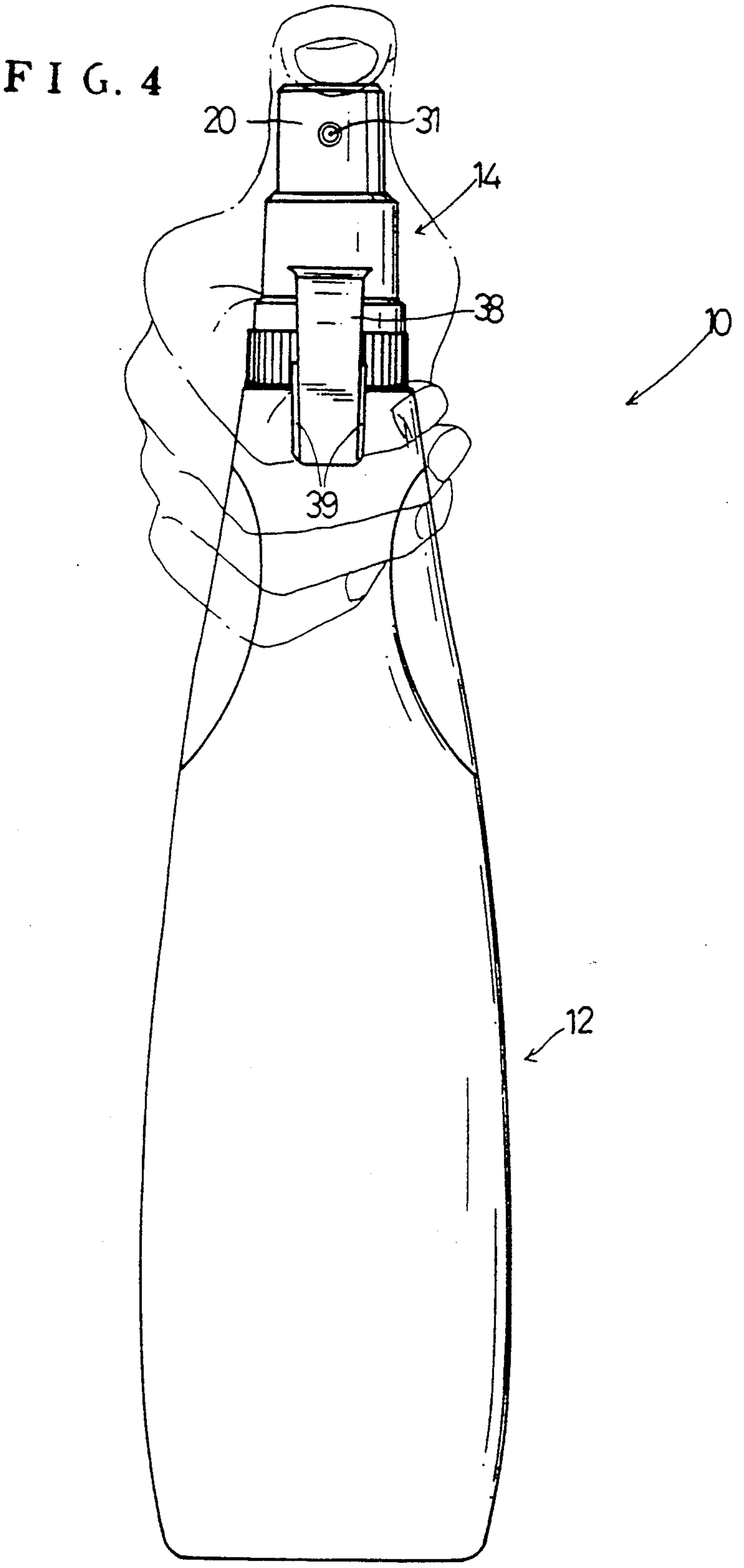

The container 12 is shaped such that it can be held with fingers except for the thumb, i.e., the forefinger, the middle finger, the ring finger and the little finger. As shown in FIGS. 1 to 4, the container 12 is generally flat, having an elliptical cross section. Its diameter gradually increases from the top to the bottom. The container 12 has a recessed portion 12-1 near the top, and can therefore be held steadily by a user, with the palm resting on the back of the neck portion 12-1 and the fingers wrapping around one side and the front of the neck portion 12-1, as illustrated in FIGS. 2, 3 and 4.

The container 12 can have a bulging portion 12-2 at the back of the upper portion, as is indicated by the one-dot, one-dash lines in FIGS. 3 and 4. With the bulging portion 12-2, the upper portion of the container 12 will fit better in the palm, and the container 12 will be held more steadily.

As shown in FIG. 1 the manually operated push type dispenser 14 comprises a cylinder 16, a piston 18 slidably inserted in the cylinder 16, and a push button 20 secured to the top of the piston 18. All these components 16, 18, and 20 are made of plastics.

The cylinder 16 comprises a cylinder body 17 and a cap 24. The cylinder body 17 has an upper sleeve 22. The cap 24 is fixed to the sleeve 22 and covers the push button 20. Annular grooves 25 are formed in the outer periphery of the sleeve 22. Annular projections 25 are formed on the inner periphery of the cap 24. The projections 25 of the cap 24 are fitted in the grooves 25 of the sleeve 22, whereby the cap 24 is fixedly mounted on the sleeve 22. The cap 24, made separately from the sleeve 22, can be fixedly mounted on the sleeve 22 with ease, when pushed down in the axial direction of the cylinder body 17.

Alternatively, a screw threaded can be cut in the outer periphery of the sleeve 22, and also in the inner periphery of the cap 24, so that the cap 24 may be set in screw engagement with the sleeve 22. Still alternatively, the cap 24 can be fused together with sleeve 22.

Figure 5:
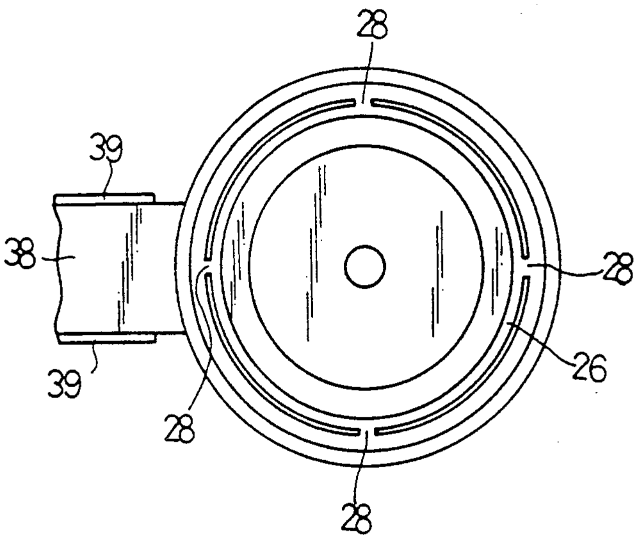
FIG. 5 is a partial plan view illustrating the container-dispenser combination shown in FIG. 1.

The cap 24 comprises an upper, thin portion 24U and a lower, thick portion 24L, and a connector 28 connecting the portions 24U and 24L together—all integrally formed with one another. As shown in FIG. 5, the connector 28 consists of connecting pieces connecting the portions 24U and 24L together. The connecting pieces are thin enough to be easily broken when the upper portion 24U is turned. Once these connecting pieces are broken, the upper portion 24U can be removed from the lower portion 24L.

As evident from FIG. 5, the connector 28 consists of four connecting pieces, which are spaced apart at regular angular intervals. Nonetheless, it can be formed of more or less connecting pieces and these connecting pieces can be arranged in a different fashion.

Since the cap 24 covers the push button 20, it protects the push button 20 and prevents the the push button 20 from being pushed down. Hence, the push button 20 is not pushed down unnecessarily until the connector 28 is broken, making it possible to remove the upper portion 24U of the cap 24 from the lower portion 24L thereof. This prevents leakage of the liquid filled in the container 12 during the transport or display of the container-dispenser combination.

As explained above, when the upper portion 24U is turned, the connector 28 is broken, whereby the upper portion 24U can be removed from the lower portion 24L, exposing the push button 20. Once exposed, the push button 20 can be pushed down as illustrated in FIGS. 2 to 4. The upper portion 24U of the cap 24 functions as so-called "virgin cap".

The push button 20 has a double-tube structure, comprising an inner cylinder 20-1 and an outer cylinder 20-2 located co-axially with, and surrounding the inner cylinder 20-1. The upper end portion of the piston 18 is slidably fitted in the inner cylinder 20-1. The push button 20 has a recess in the front of its upper portion. A nozzle 30 is fitted in this recess. The nozzle 30 is of the known structure, and has an orifice 31 and a passage 32. The liquid supplied from the container 12 and pressurized when the push button 20 is pushed down, passes through the passage 32, makes an eddy flow, and is forced out through the orifice 31.

A rotation-preventing means 34 is provided between the cylinder 16 and the push button 20, preventing the push button 20 from rotating. In this respect, the dispenser 14 is different from the conventional manually operated push type dispenser, in which the push button is left free to rotate.

The rotation-preventing means 34 comprises a guide groove 35 and a projection 36 loosely fitted in the groove 35. The guide groove 35 is formed in the back of the lower portion of the outer cylinder 20-2 of the push button 20. The projection 36 protrudes from the back of the sleeve 22 of the cylinder body 17. The push button 20 can, therefore, move up and down, without rotating, keeping the orifice 31 oriented forward.

Alternatively, the guide groove 35 is formed in the back of the sleeve 22 of the cylinder body 17, and the projection 35 can protrude from the outer cylinder 20-2 of the push button 20.

Further, more guide grooves and more projections can be formed. For example, three guide grooves and three projections are formed, where are spaced apart at angular intervals of 120°. Still further, the rotation-preventing means 34 can be formed of any elements other than the guide groove 35 and the projection 36 (both shown in FIG. 1), provided that these elements co-operate to prevent the rotation of the push button 20 and to orient the orifice 31 in one direction.

A flange 38 protrudes from the front of the lower portion 24L of the cap 24, for preventing the fingers holding the container 12 from slipping upwards. The flange 38 comprises a pair of projections 39 protruding from the front of the lower portion 24L, as illustrated in FIGS. 2 to 4. The lower edge of either projection 39 is curved gently, so that the forefinger well rest on the lower edges of these projections 39.

The piston 18 is a thin hollow cylinder. A pair of flared seals 40 are formed at the lower end of the piston 18. A secondary valve 42 is fitted in the upper end portion of the piston 40. In the cylinder body 17, a return spring 44, which is a compression spring, is located between the lower end of the cylinder body 17 and the lower end of the piston 18, thus biasing the piston 18 and the push button 20 upwards. Alternatively, the return spring 44 can be arranged in the sleeve 22, thus directly biasing the push button 20 upwards. An annular space 45 is defined between the flared seals 40. When the piston 18 is pushed down, air flows from the atmosphere into the container 12 through this annular space 45, thereby building up no negative pressure within the container 12.

A valve rod 46 is arranged partly in the cylinder body 17 and partly in the liquid passage 19 of the piston 18. The rod 46 has a cone-shaped tip 46-1 which is thicker than the other portion. The lower end of the cone-shaped tip 46-1 abuts on the annular projection 48 protruding from the inner periphery of the piston 18, thus holding the piston 18 at the initial position shown in FIG. 1. The valve rod 46 has a thick lower end 46-2. The lower end 46-2 is pushed down onto a valve seat 49, whereby the valve rod 46 is held within the cylinder body 17. The lower end 46-2 has notches in its periphery. Through these notches the liquid can flow upward from the container 12 into the cylinder body 17.

While the piston 18 is held at the initial position, the cone-shaped tip of the valve rod 46 closes the liquid passage 19 of the piston 18, this disconnecting the orifice 31 from the container 12. Hence, no liquid flows out through the orifice 31 as long as the piston 18 remains at the initial position.

A primary valve 50 is fitted in the lower end of the cylinder body 17 and positioned below the lower end 46-2 of the valve rod 46. A suction tube 52 is connected to the lower end of the cylinder body 17.

The cylinder 16 is attached, in screw engagement, to the top of the container 12 with a bottle cap 53. Therefore, the cylinder 16 can easily be detached from the container 12. Alternatively, the cylinder 16 can be integrally formed with the bottle cap 53, or its lower end can be fitted in the container 12.

To use the container-dispenser combination, the user turns or twists the upper portion 24U (i.e., the virgin cap) of the cap 24, breaking the connector 28, and removes the upper portion 24U from the lower portion 24L, thus exposing the push button 20. The user holds the container 12 with his or her forefinger, middle finger, ring finger and little finger resting on the recessed portion 12-1 of the container 12, as illustrated in FIGS. 2 to 4. User then pushes the push button 20 down several times with the thumb, against the force of the return spring 44, until the liquid is thereby sucked up from the container 12 into the cylinder 16 through the suction tube 52 and the primary valve 50, filling up the cylinder 16. Thereafter, every time the user pushes the push button 20 and, thus, the piston 18, the liquid is pressurized in the cylinder 16. The pressurized liquid flows from the cylinder 16 to the nozzle 30 through the passage 19 of the piston 18 and the passage 32 of the push button 20. It makes an eddy current in the nozzle 30, and is dispensed forward through the orifice 31.

Since the push button 20 is depressed with the thumb which can exert a greater force than the other fingers holding the container 12, the cylinder 16 can have so large an inside diameter that the dispenser 14 can dispense the liquid in a sufficiently great unit amount.

Because of the large force exerted on the push button 20 and pushing down the button 20, the dispenser can dispense even a viscous liquid with ease. The container-dispenser combination can, therefore, be applied to various uses.

Since the push button 20 is pushed down with the thumb which can move more freely in a greater space than the other fingers, the container-dispenser combination has high operating efficiency.

Further, since the cylinder 16 comprises the cylinder body 17 and the cap 24, and the flange 38 can be formed on the cap 24, the cylinder body 17 is simple in structure.

As mentioned above, since the rotation-preventing means 34 prevents the push button 20 from rotating, both the orifice 31 and the flange 38 are oriented in substantially the same direction. The fingers holding the container are, thus, placed under the flange 38. Hence, they are protected from the liquid being jetted via the orifice 31. The pair of projections 39, which are components of the flange 38, fully cover the fingers holding the container 12, and prevent the fingers from being wetted with the liquid.

Figure 6:
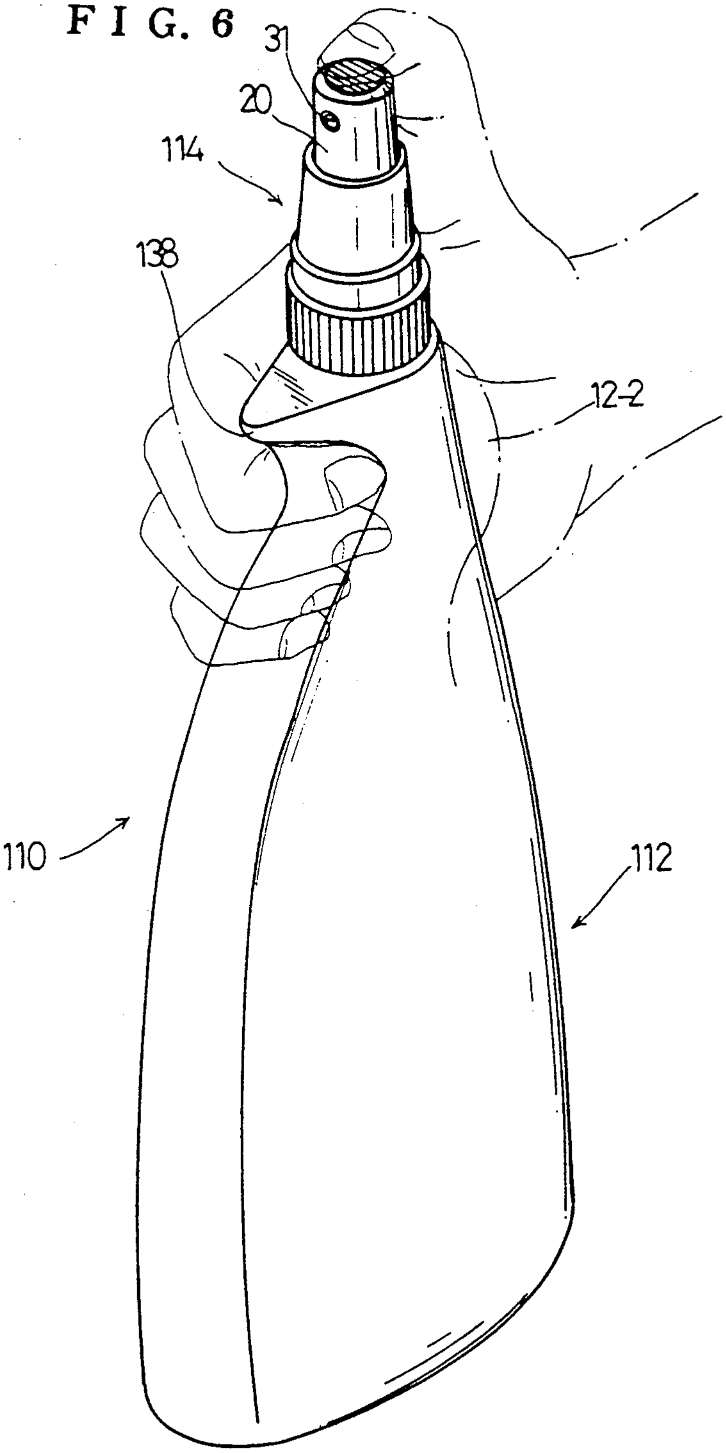
FIGS. 6, 7, and 8 are a perspective view, a side view, and a front view, respectively, showing a combination of a container and a manually operated push type dispenser, according to the second embodiment of the invention.
Figure 7:
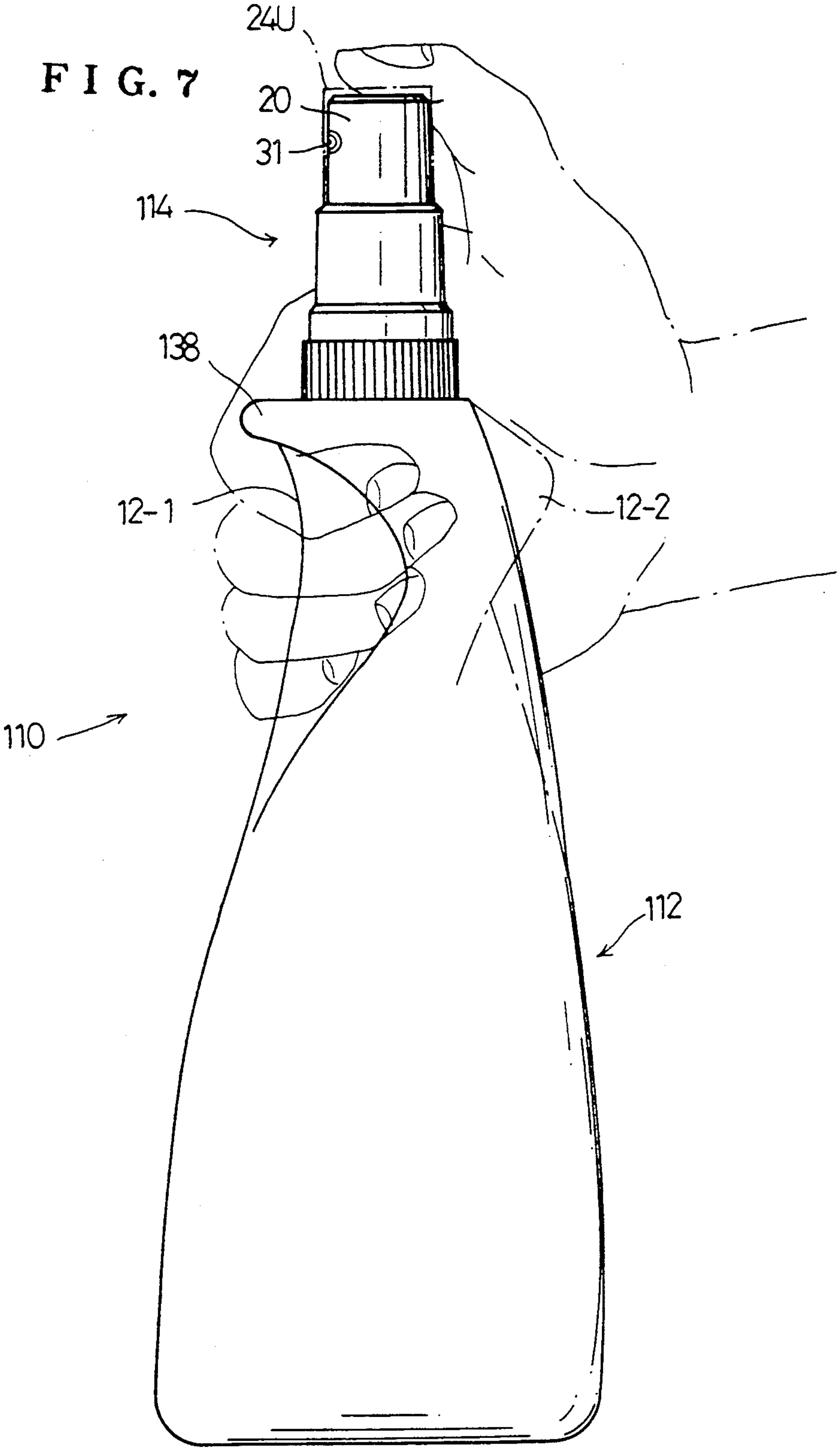
Figure 8:
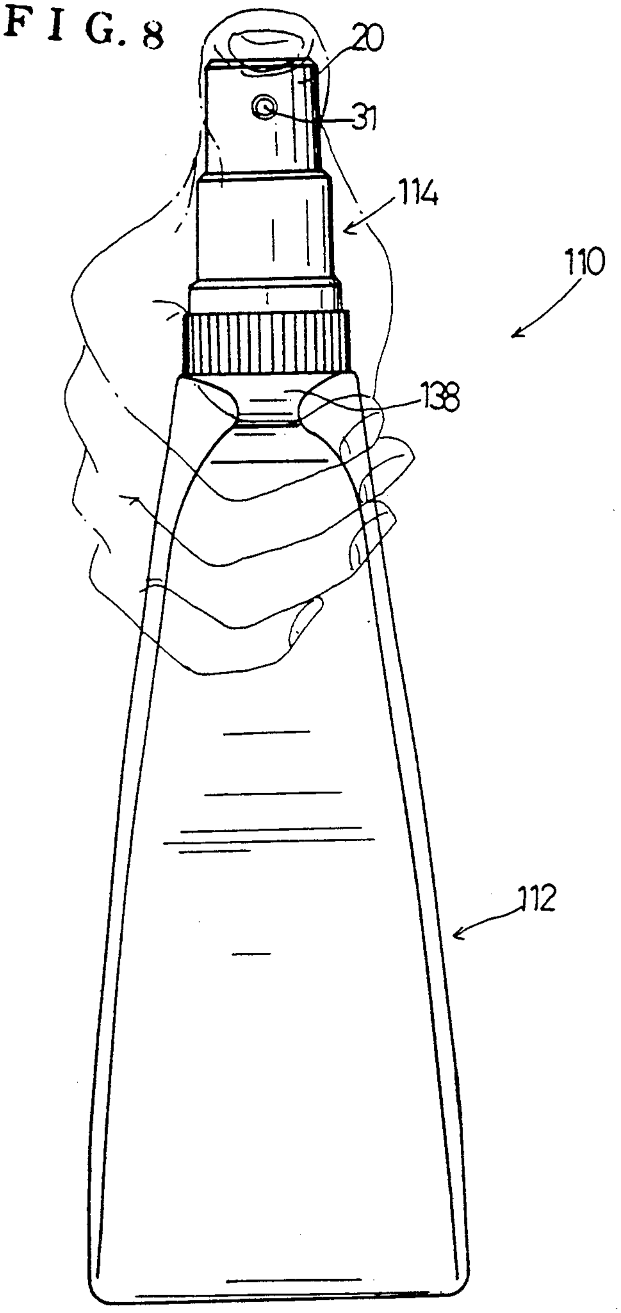

In the embodiment shown in FIGS. 1 to 5, the flange 38 is integrally formed with the cylinder 16. Instead, a flange 138 can be integrally formed with the container 12, as is shown in FIGS. 6, 7, and 8 which illustrate a container-dispenser combination 110 according to a second embodiment of the invention. The cylinder of the dispenser 114 is more simple in structure than the cylinder 17 of the dispenser 14 shown in FIG. 1, though the container 112 is somewhat complex in shape. Nevertheless, as known in the art, it is more difficult to assemble a dispenser than to form a container by injection molding. In view of this, the container-dispenser combination 110 is advantageous over the container-dispenser combination 10 illustrated in FIGS. 1 to 5.

Figure 9:
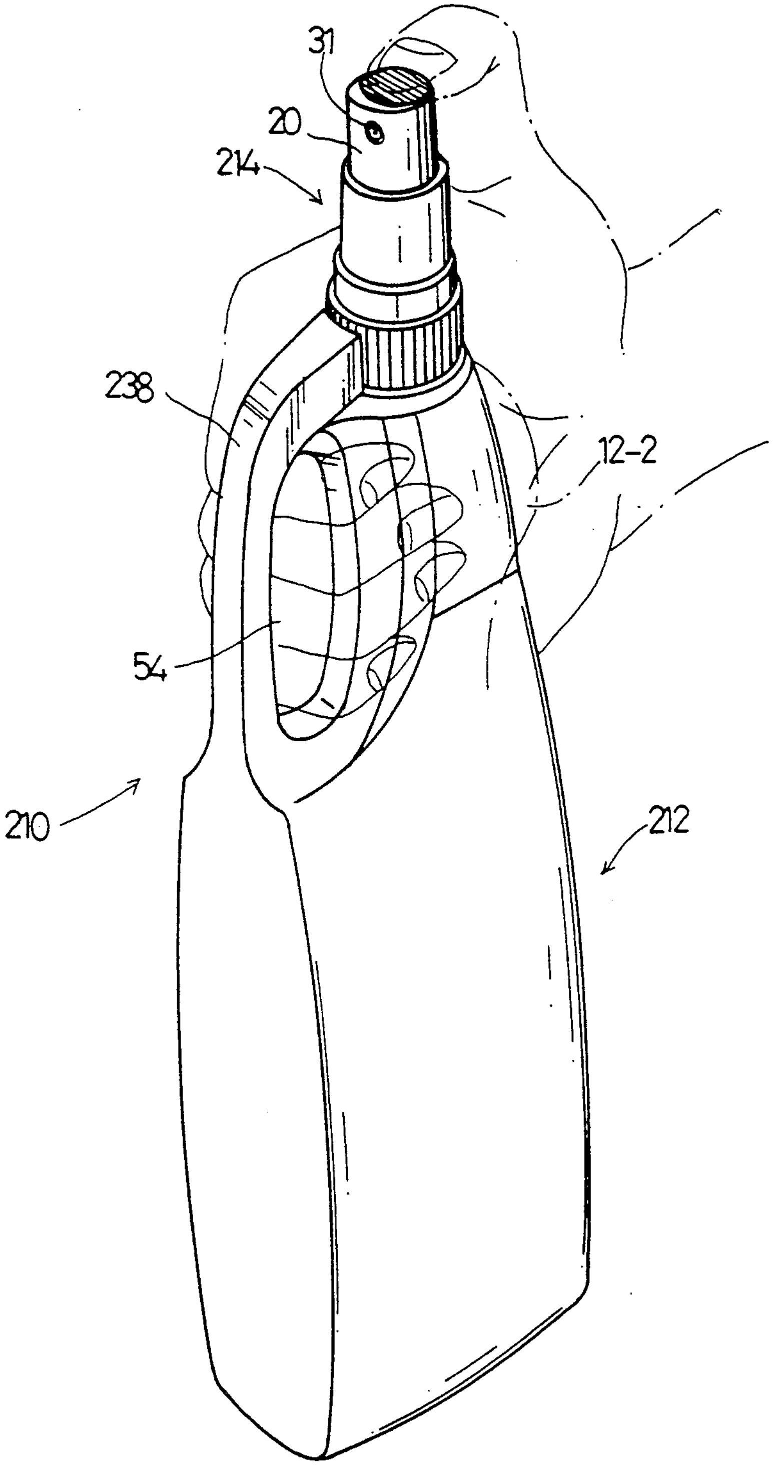
FIGS. 9, 10, and 11 are a perspective view, a side view, and a front view, respectively, showing a combination of a container and a manually operated push type dispenser, according to the third embodiment of the present invention.
Figure 10:
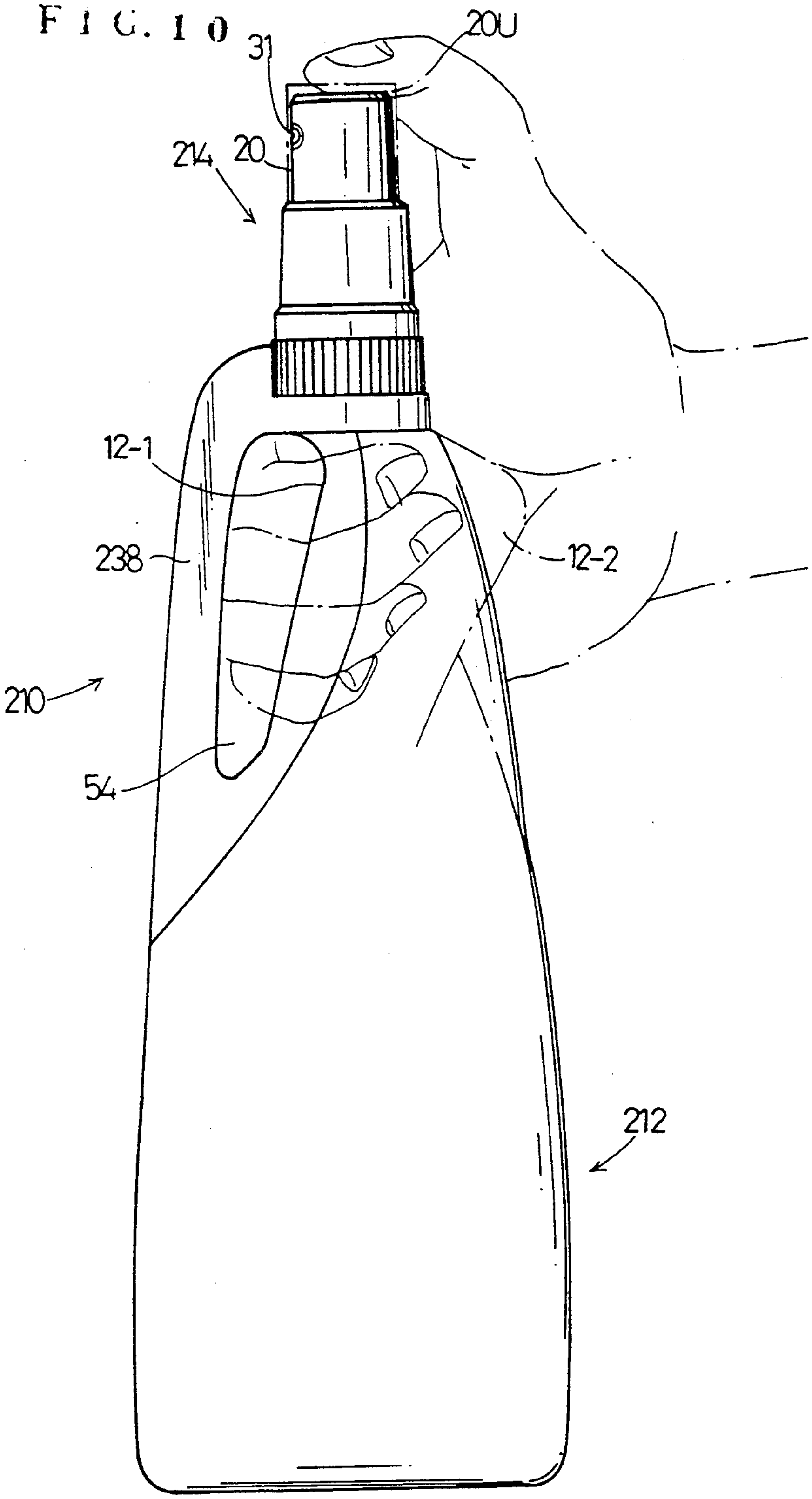
Figure 11:
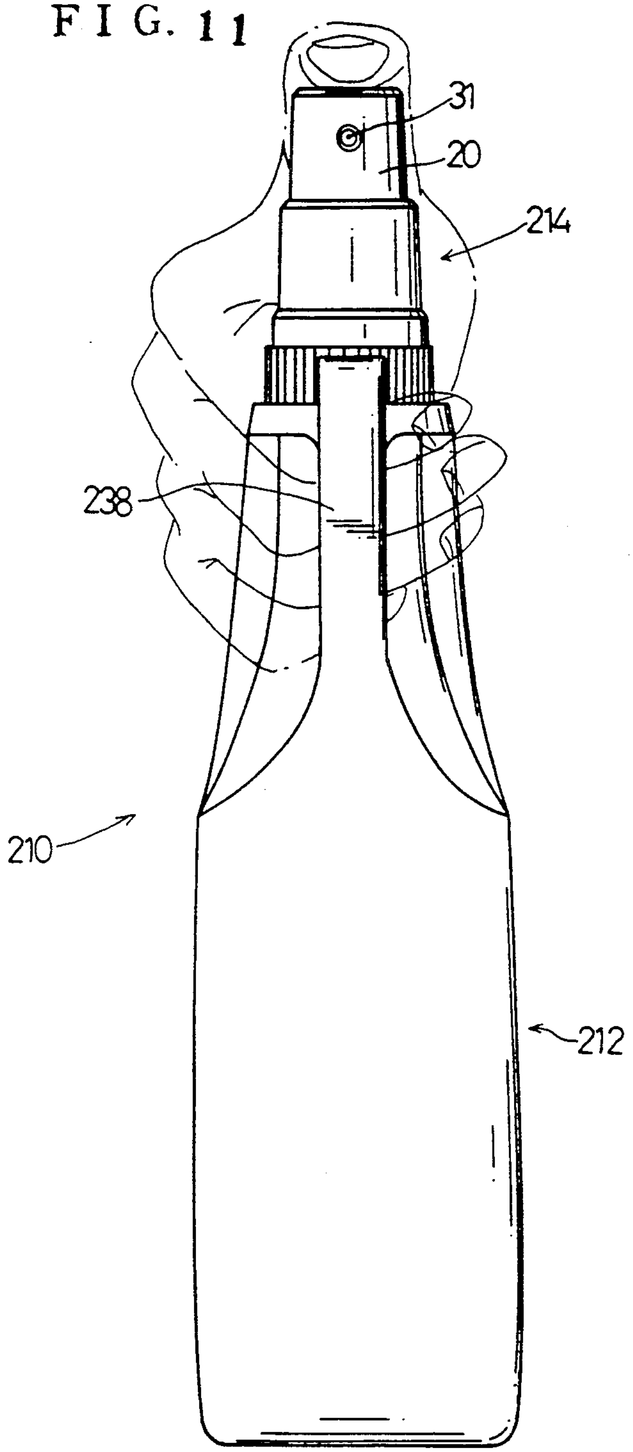
Figure 12:
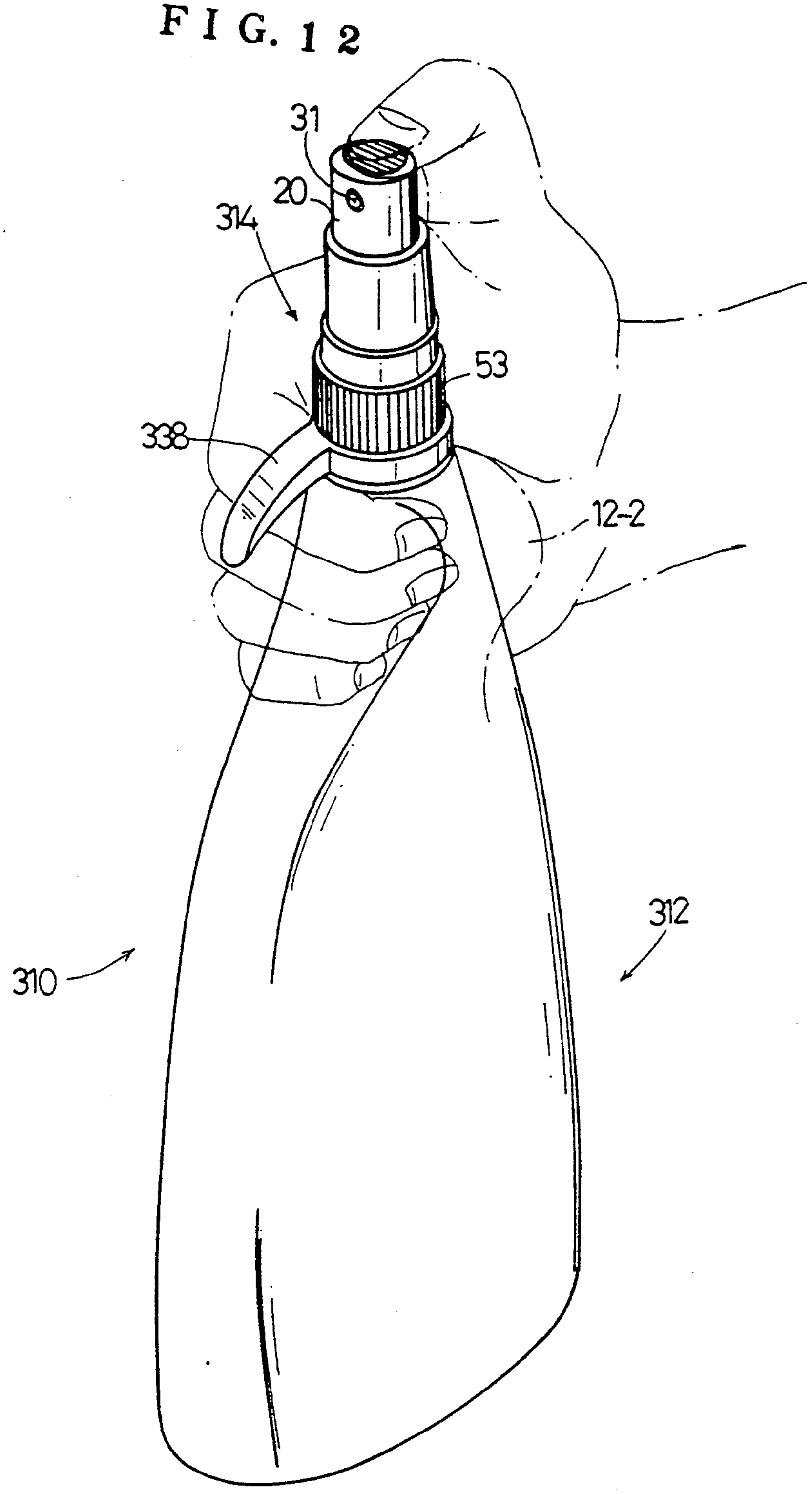
FIGS. 12, 13, and 14 are a perspective view, a side view, and a front view, respectively, showing a combination of a container and a manually operated push type dispenser, according to the fourth embodiment of the invention.

FIGS. 9, 10, and 11 show a container-dispenser combination 210 according to a third embodiment of the present invention. The third embodiment is identical in structure to the first embodiment shown in FIGS. 1 to 5, except in that a flange 238 connected at the upper end to the cylinder of the dispenser 214, and at the lower end to a container 212. As understood from FIGS. 9 to 11, the flange 138 and the recessed portion of the container 212, with the fingers all, but the thumb, extending through the hole 54. Since the flange 238 is connected to the container 212 at the lower end, it is stronger than its counterpart of the first embodiment (FIGS. 1 to 5). In addition, the fingers holding the container 212 are prevented from slipping, not only upwards but also downwards.

Figure 15:
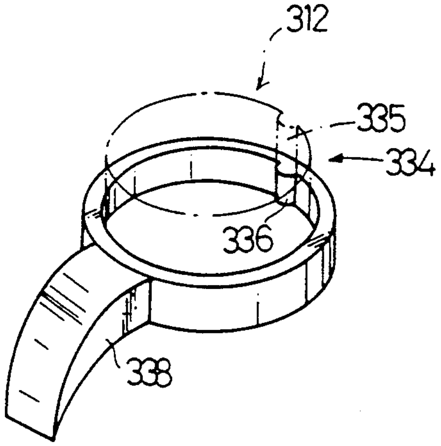
FIG. 15 is a perspective view showing the flange of the container-dispenser combination illustrated in FIGS. 2 to 14.
Figure 16:
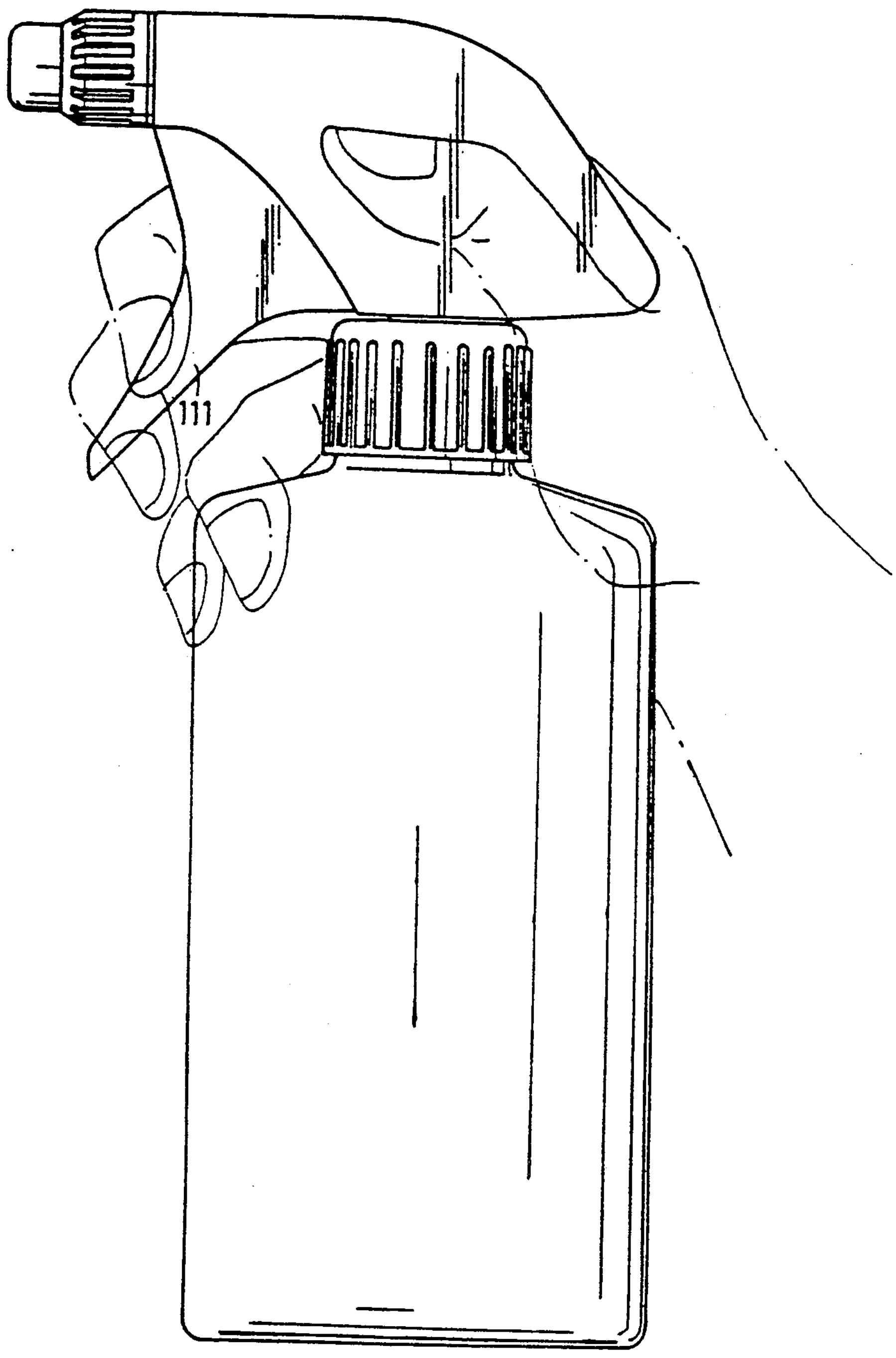
FIG. 16 PRIOR ART
FIG. 16 is a side view showing a conventional manually operated trigger type dispenser.
Figure 17:
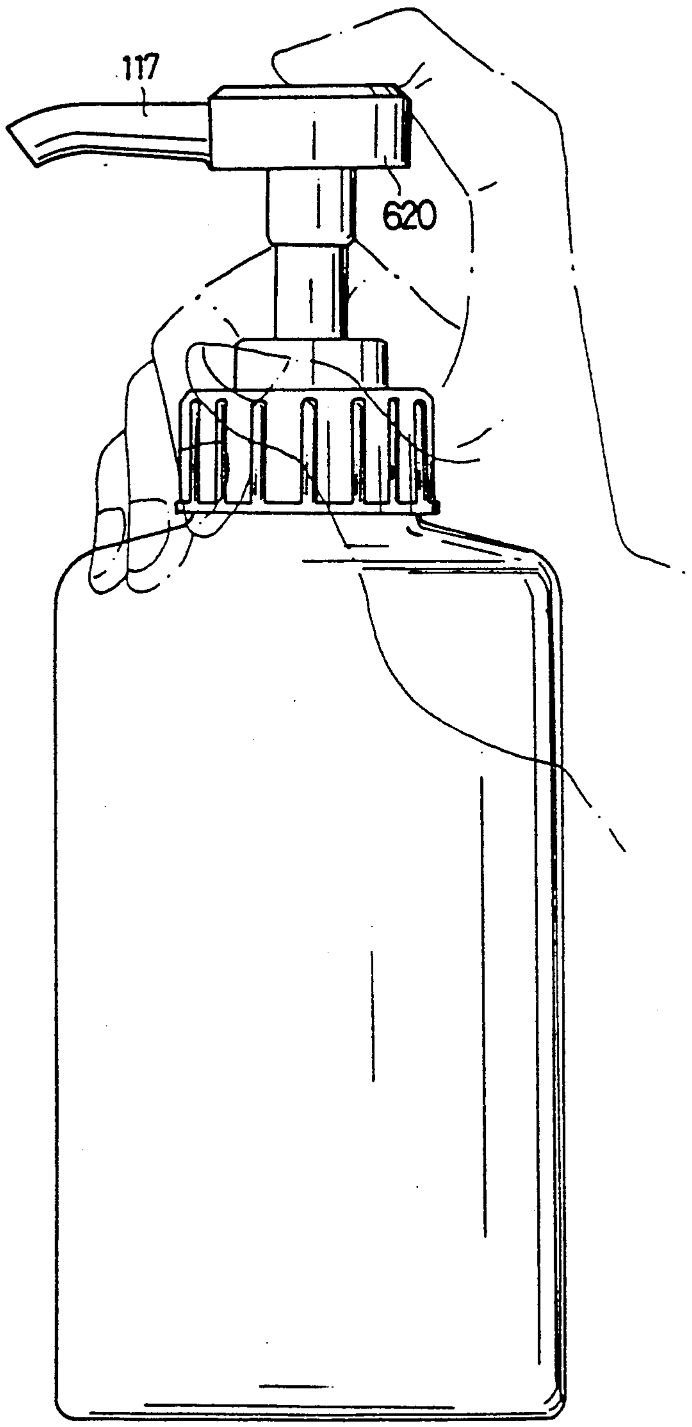
FIG. 17 PRIOR ART
FIG. 17 is a side view illustrating a conventional manually operated push type dispenser.
Figure 18B:
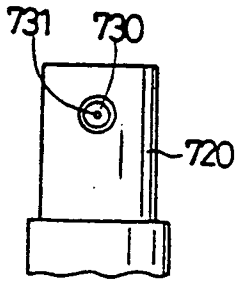
FIGS. 18A and 18B are a side view of a conventional manually operated smaller push type dispenser, and a partial front view thereof, respectively.
Figure 18A:
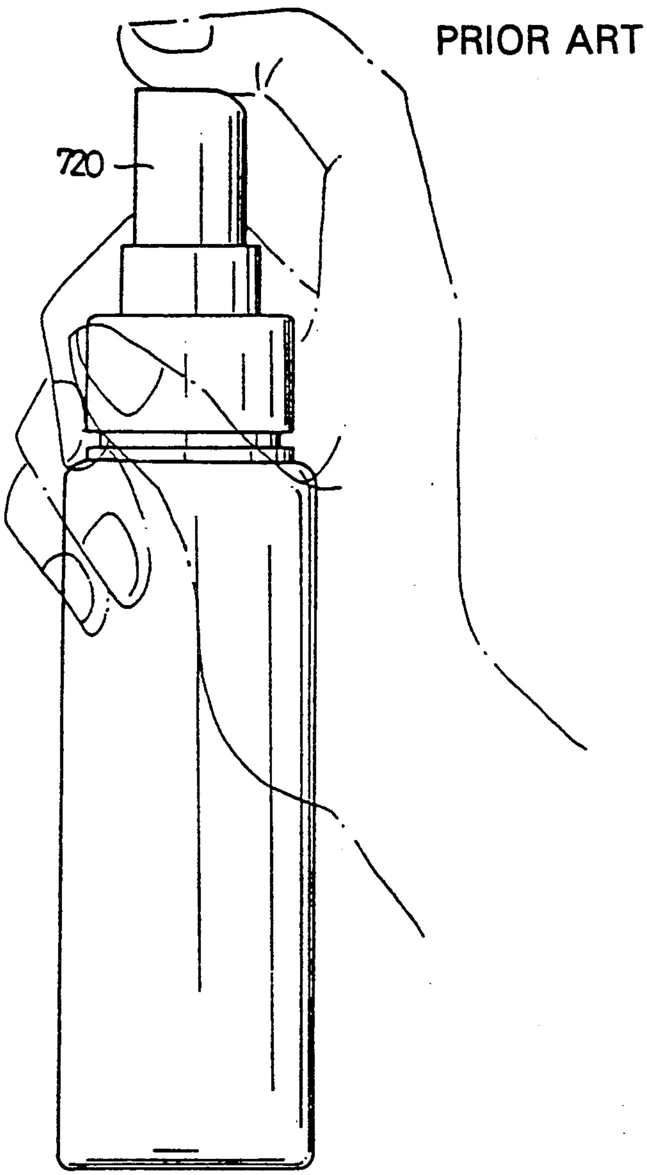
PRIOR ART FIG. 18(A)

FIGS. 12 to 15 show a container-dispenser combination according to a fourth embodiment of the invention. The fourth embodiment is characterized in that a flange 338 is a separate member in the shape of a ring with a projection, as illustrated in FIG. 15. A bottle cap 53 is mounted on the mouth of the container 312 in screw engagement therewith, thus holding flange 338 to the container 312. This container-dispenser combination 310 has rotation-preventing means 334. As shown in FIG. 15, the means 334 comprises a guide groove 335 formed in the periphery of the mouth portion of the container 312, and a projection 336 formed on the inner periphery of the flange 338 and fitted in the guide groove 335. It should be noted that the rotation-preventing means 334 is not limited to this configuration.

Since the flange 338 is a member separatedly formed, both the container 312 and the cylinder 16 of the dispenser 314 are simple in structure and can, therefore, be produced easily.

Figure 13:
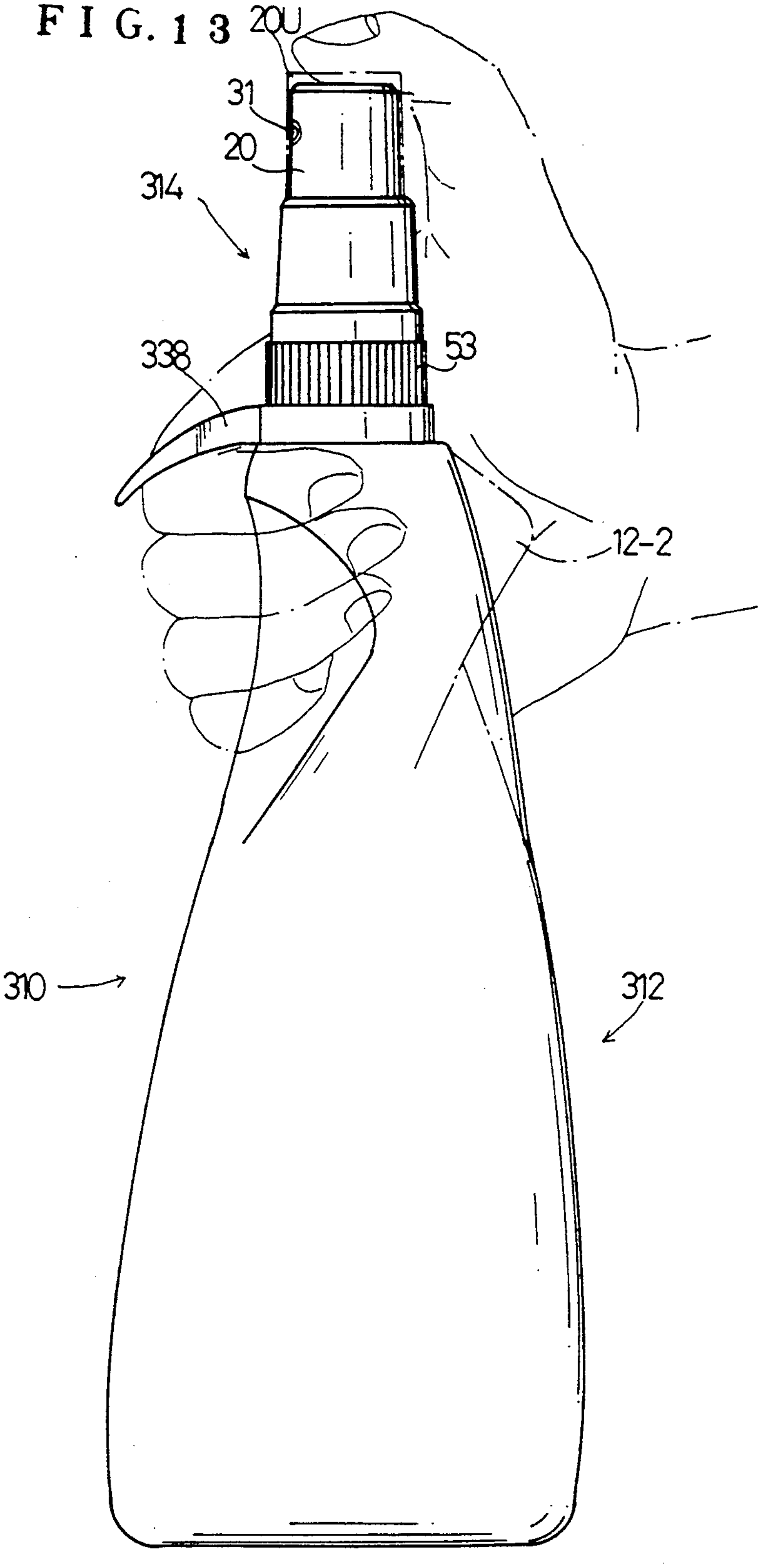
Figure 14:
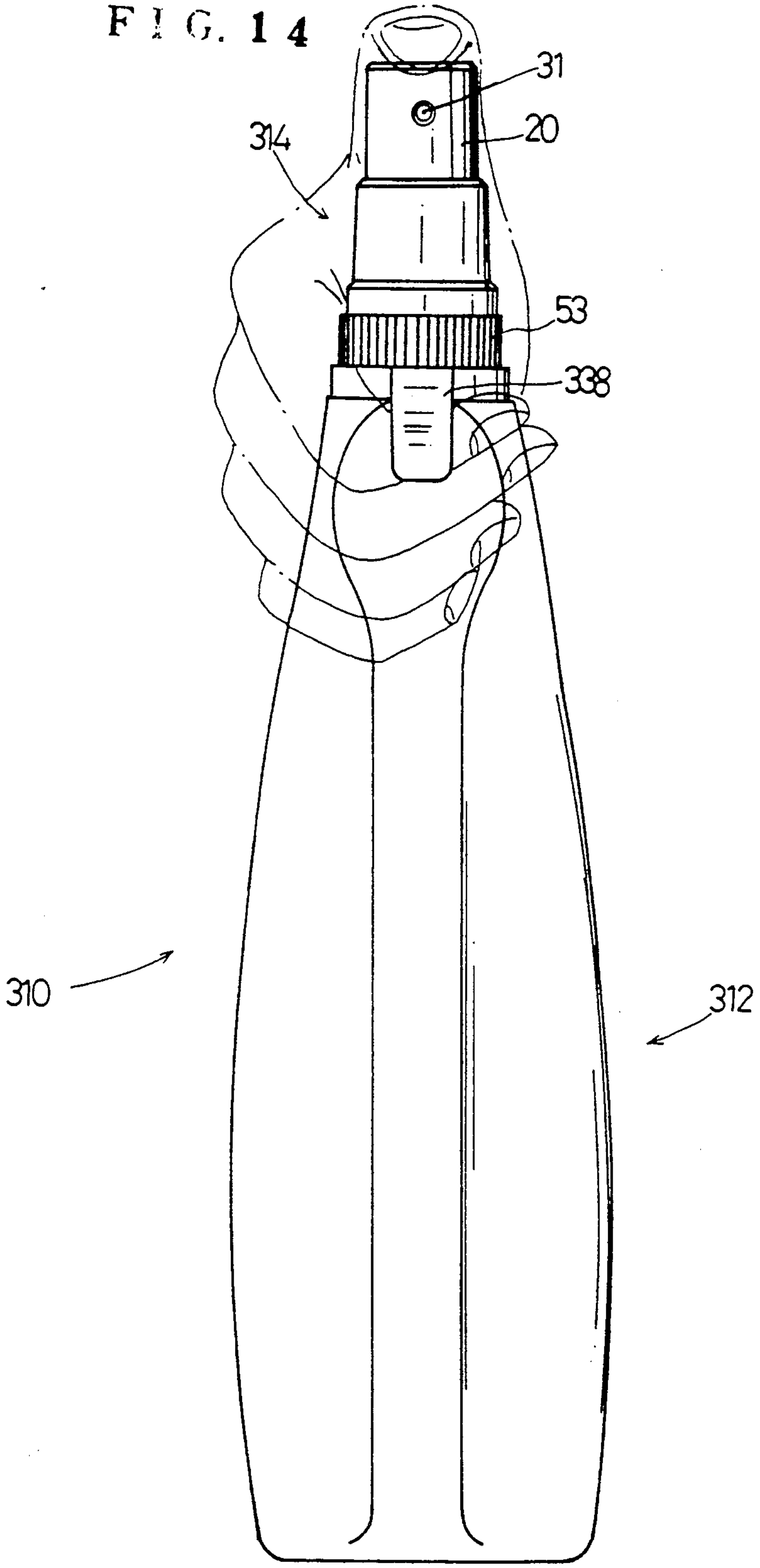

The second, third, and fourth embodiments are substantially identical to the first embodiment, in respect of the structures of the cylinder, the piston, and the push button. Needless to say, the cap 24 comprises upper portion 24U and a lower portion 24L connected to the upper portion 24U by a connector 28. The upper portion 24U can be removed from the lower portion 24L, thus exposing the push button 20. Once exposed, the push button 20 can be pushed down with the thumb, as illustrated in FIGS. 7, 10, and 13.

In each of the embodiments shown in the drawings, the container is held with four fingers, i.e., the forefinger, the middle finger, the ring finger and the little finger. Instead, the container can be held with only two or three of these fingers.

As described above, according to the present invention, the push button of the manually operated push type dispenser is pushed down with the thumb, and hence, with a great force, while the container is held firmly with some or all of the other four fingers. Thus, the cylinder of the dispenser can have a large inside diameter, so that the dispenser can force out the liquid in a great unit amount.

Moreover, since the push button is depressed with the thumb which can be moved with greater freedom in a larger space than the other fingers, the push button can be operated with a high efficiency.

Further, since the rotation-preventing means prevents the push button from rotating, the orifice and the flange are oriented in substantially the same direction. Hence, the flange covers the fingers holding the container, and thus protects them from the liquid being sprayed from the orifice or dripping from the orifice.

What is claimed is:

1. In a combination of a container for containing liquid and a manually operated push type dispenser having a cylinder attached to a mouth of the container, a piston reciprocally movable in the cylinder, and a push button fixed to a distal end of the piston and having an orifice communicating with the cylinder through the piston, wherein the piston is moved reciprocally in the cylinder, thereby to suck up the liquid from the container into the cylinder, pressurize the sucked up liquid in the cylinder, and dispense the pressurized liquid through the orifice of the push button; the improvement comprising:

said container including:

a neck portion with a front and a back, a recessed portion at the front of the neck portion, and a bulging portion means, at the back of the neck portion, for fitting in the palm of a hand, such that fingers of the hand except for the thumb are able to wrap around one side and the front of the neck portion to hold the container firmly when said push button is pushed down with the thumb, a rotation-preventing means provided between said cylinder and said push button for preventing said push button from rotating so as to orient said orifice in a fixed direction, and flange means integrally connected with said cylinder for preventing slipping of the fingers holding the container, said flange means being oriented in substantially the same direction as the orifice.

2. The combination according to claim 1, wherein said cylinder comprises a cylinder body containing said piston, and a cap formed separately from the cylinder body, covering said push button, said cap including a lower half secured to the cylinder body, an upper half and a connecting piece detachably connecting the upper half to the lower half, said connecting piece being sufficiently thin so as to break when the upper half is turned relative to the lower half, and said flange is integrally formed with the lower half of said cap.

3. The combination according to claim 2, wherein said push button has an axis, and said rotation-preventing means comprises a guide groove formed in one of said cylinder and said push button and extending parallel to said axis, and a projection protruding from the other of said cylinder and said push button and loosely fitted in the guide groove.

* * * * *